Aug. 19, 1947.  E. H. TJOMSLAND  2,425,966
SHUFFLEBOARD WEIGHT
Filed Feb. 19, 1947

INVENTOR
Eli H. Tjomsland
BY
ATTORNEY

Patented Aug. 19, 1947

2,425,966

UNITED STATES PATENT OFFICE 2,425,966

SHUFFLEBOARD WEIGHT

Eli H. Tjomsland, Maywood, N. J.

Application February 19, 1947, Serial No. 729,596

15 Claims. (Cl. 273—128)

This invention relates to shuffleboard weights.

Weights used for playing shuffleboard are made of metal and must carry some identification in order to distinguish those used by the different teams. The name of he manufacturer of the shuffleboard is also displayed on the weights. In order to carry the team identification and the manufacturer's name in letters that will not wear away when the weights are used over long periods, it has been the practice to make shuffleboard weights out of cast iron. Such weights cannot be held to very close manufacturing tolerances and they have the further disadvantage that they sometimes chip when struck together violently.

It is an object of this invention to provide an improved shuffleboard weight constructed in such a way that identifying letters and the manufacturer's name can be permanently displayed without resorting to cast letters. With this construction it is practical to make the weight of steel which is machined to size with the resulting advantage that the actual mass can be held within close manufacturing tolerances. Other features of the construction relate to surface contours that permit identifying colors to be applied to the weight and that protect the color from contact with the player's fingers so that the color is not worn away by repeated handling of the weights.

Another object of the invention is to provide a shuffleboard weight construction which prevents bouncing of a weight when it strikes against another weight during play. This result is obtained by locating the center of gravity of the weight, and the maximum peripheral diameter of the weight, in a common plane parallel to the shuffleboard so that when the weight is stopped abruptly, by striking another weight, there is no turning moment that will bounce the weight and possibly cause it to upset.

Another object is to provide a shuffleboard weight with an improved bottom surface that is hollow ground to give the weight a bearing zone of substantial diameter. Other features of the bottom surface construction relate to the sloping of a portion of the bottom at a slight angle upwardly away from the center region, and to the provision of ridges on the bottom surface of the weight for causing the weight to follow a truer course when there are slight irregularities in the surface of the shuffleboard.

Other objects relate to surface contours of the weight that make it easier to hold and more convenient to use. Still other objects, features and advantages of the invention will appear or be pointed out as the description proceeds.

In the drawing, forming a part hereof, in which like reference characters indicate corresponding parts in all the views, Fig. 1 is a top plan view of a shuffleboard weight embodying this invention.

Figure 1:
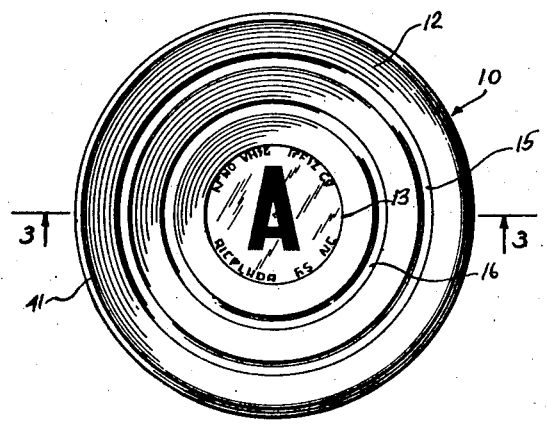
Figure 2:
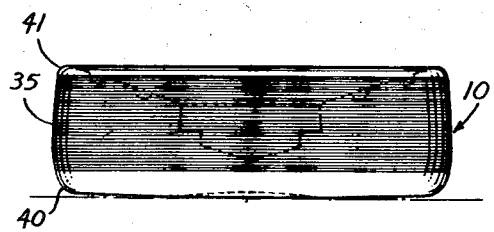
Fig. 2 is a side elevation of the shuffleboard shown in Fig. 1.
Figure 3:
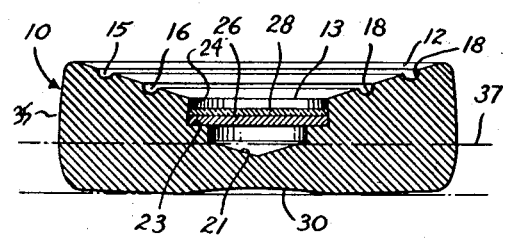
Fig. 3 is a sectional view taken on the line 3—3 of Fig. 1.

Fig. 1 shows a shuffleboard weight 10 which has a circular horizontal cross section. The weight has a top surface 12 that slopes downward to a center recess 13. The downwardly sloping surface 12 has two annular grooves 15 and 16 which are preferably concentric with the center recess 13. These grooves 15 and 16 have their bottom or side surfaces, or preferably both, coated with colored paint 18 for identifying the weights. For example, a set of shuffleboard weights embodying this invention may have red paint 18 in the grooves 15 and 16 of the weights for one team and yellow paint in the corresponding grooves of the weights for the other team.

The radius of cross section of each of the grooves 15 and 16 is preferably small so that a finger of a person handling the weight does not come in contact with the paint 18. This prevents the paint from being worn away by repeated handling of the weight. The radius of curvature of the cross section of the grooves 15 and 16 is preferably less than one-half inch; or if the grooves 15 and 16 are not of segmental cross section, the ratio of the groove width to the groove depth is such that an arc of a circle tangent to the bottom of the groove and passing through the inner and outer top edges of the groove will have a radius of curvature less than one-half inch.

The annular grooves 15 and 16 are merely representative of depressions in the sloping top surface 12, and it should be understood that the weight 10 may be made with only one of the grooves 15 and 16, and that the grooves need not be continuous. Where discontinuous grooves are used, the radius of curvature of the cross section of the groove is kept small in the same way as with the continuous grooves, and if the grooves are made so short that their length is equal to their width, the cross section can be made with the same contour in all directions.

The center recess 13 is preferably made by drilling an opening in the top of the weight and down to the level 21. The bottom of the recess 13, at this level 21, corresponds in slope with the point of the drill used. This drill is substantially smaller in diameter than the final diameter of the recess 13. After drilling to the level 21, the weight 10 is turned on a lathe, or otherwise machined, to produce a bottom shoulder 23 and to provide a frustro-conical side wall 24 which extends upward from the shoulder 23 and decreases in diameter toward the top surface of the weight.

A disk 26 is placed in the center recess 13 and rests on the bottom shoulder 23. This disk 26 is of substantially the same diameter as the maximum diameter of the center recess 13, that is, the diameter of the recess at the level of the bottom shoulder 23. The disk 26 is preferably of heavy paper or card board and sufficiently flexible to bend slightly as it passes through the upper part of the center recess 13 where the recess diameter is slightly less than the diameter of the disk. On the disk 26 there is printed an identifying letter, the name of the shuffleboard manufacturer, or any other desired indicia.

A transparent disk 28, of substantially the same diameter as the disk 26, is pressed into the center recess 13 above the disk 26 to protect the paper disk. This transparent disk 28 is preferably made of thin clear plastic material. It is a feature of the invention that the shoulder 23 is not far below the top edge of the center recess 13. This feature, in combination with the downward slope of the top surface 12, makes it possible to see the identifying letter on the disk 26 when viewing the disk at considerable distance from the side. However, the shoulder 23 is located far enough below the top edge of the recess 13 so that another weight of the same diameter as the weight 10 cannot touch the surface of the disk 28 when the weight 10 runs off the playing surface of the shuffleboard and another weight rolls or falls against the top of the weight 10. Having other weights strike the disk 28 would damage the disk. This protection for the disk 28 is obtained by having the top surface of the disk 28 below the top of the recess 13 by a distance greater than the depth of a segment of a circle that passes through the top edges of the recess 13 and that has a radius not less than the minimum radius of the peripheral surface 35.

The extent of undercut of the side of the center recess 13 depends upon the kind of material used for the transparent disk 28, or for the indicia-carrying disk 26, if no overlying transparent disk is used. The slope of the side of the center recess 13 should be sufficient, in relation to the stiffness of the disks, to prevent the disks from falling out when the weight is held upside down.

The weight 10 has a bottom surface comprising a concave hollow ground center region 30 and an upwardly sloping annular region surrounding the hollow ground region 30 and merging with the region 30 in a smooth curve. The hollow ground region 30 is circular and concentric with the axis of the weight. It has a diameter which is preferably of the order of from three-quarters inch to one inch. The upwardly sloping annular region preferably makes an angle of about 1° with the surface of the shuffleboard when the weight is at rest on the board. The angle of this sloping region is exaggerated in the drawing for clearer illustration.

Figure 4:
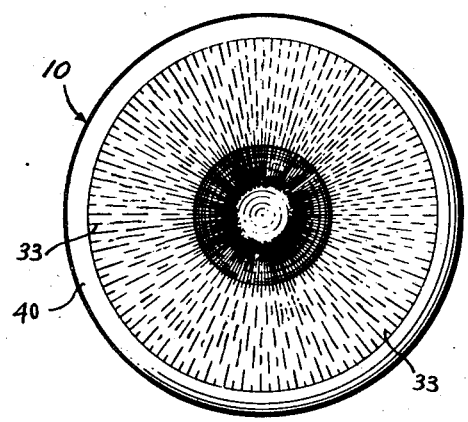
Fig. 4 is a bottom plan view of the shuffleboard weight shown in the other figures.

When at rest, the weight contacts with the shuffleboard around a circular line or zone corresponding to the circle around which the hollow ground center region 30 merges into the annular region. When the weight is moving along the surface of the shuffleboard, there is a tendency for the weight to rock forward slightly so that its contact with the shuffleboard is along a radial region extending from the hollow ground region 30 to the front of the weight. The bottom surface of the weight is provided with substantially radial grind lines 33, indicated in Fig. 4. These lines are a medium grind and provide, in effect, runners, that cooperate with the wax on the shuffleboard surface to make the weight follow a truer course. It has been found in practice, that the center recess 13 provides a convenient depression in which a player can place his index finger or thumb for obtaining a grip on the weight that further facilitates the sliding of the weight along a true course on the board.

When attempts have been made to obtain a plain bottom surface for shuffleboard weights of the prior art, unavoidable manufacturing tolerances have often produced irregularities giving the weights only point contact with the board, and such weights tend to follow any grooves which exist in the shuffleboard, and to wear grooves in the board.

In order to prevent possible bouncing of the weight, and resulting tipping over or rolling off the board, the weight 10 has a peripheral surface 35 of convex section which is exaggerated in the drawing for a clearer illustration. This convex surface 35 is of maximum diameter at the level of a plane 37 which passes through the center of gravity of the weight. Because of the downwardly sloping top surface 12, and the center recess 13, the center of gravity of the weight 10 is at a level substantially more than one-half way down from the top edge of the peripheral surface 35. When the weight 10 strikes a similar weight during a shuffleboard game, the point of contact of the two weights is on the plane 37 and since the center of gravity of the weight is directly behind the point of contact in the direction of motion, there is no momentum tending to overturn the weight, and the entire reaction from the impact is parallel to the surface of the shuffleboard.

In the preferred construction of the weight 10, the peripheral surface 35 is made rough so that the weight will not tend to slip out of a player's hand when picked up by fingers that may be wet with perspiration. This roughened surface is produced by grit blasting the surface 35.

The weight is preferably made of steel and pack-hardened to a depth of approximately one-sixteenth inch after machining. The grind lines 33 are applied to the bottom of the weight before hardening, but the grit blasting to roughen the peripheral surface 35 is preferably done after the weight has been case-hardened.

The weight is made with a curve 40 joining the peripheral surface with the upwardly sloping region 31 of the bottom. This curve 40 around the bottom edge of the weight preferably has a radius of the order of one-eighth inch; and a similar curve 41, preferably of smaller radius, is provided at the upper end of the peripheral surface 35 for joining that surface with the downwardly sloping top surface 12.

Changes and modifications can be made in the illustrated embodiment of the invention, and it will be understood that some features of the construction can be used alone or in different combinations without departing from the invention as defined in the claims.

I claim as my invention:

1. A shuffleboard weight having a center recess, a top wall sloping downward to said recess, open indentations in the sloping top wall and around the center recess, and pigments on the side surfaces of the open indentations.

2. A shuffleboard weight having a top wall with a center recess and an annular area that slopes downward toward the recess around the entire periphery of said recess and across the major portion of the top wall between the recess and the outer limits of said top wall, an indentation in the sloping area of the top wall with a cross section in at least one direction having an effective radius of curvature not greater than one-half inch, and paint on the surface of the indentation for identifying the weight.

3. A shuffleboard weight having a top wall that slopes downwardly toward its center over a substantial area of said wall, a recess at the center of the top wall, a circular groove in the downwardly sloping area of top wall and surrounding the recess and substantially concentric with the recess, and paint in the circular groove below the level of the portion of the top surface immediately adjacent said circular groove.

4. A shuffleboard weight comprising a cylindrical, metal body having a top surface and a circular recess opening through said top surface but extending only part way down into said metal body, substantially vertical side walls extending upward from the bottom of the recess, and identifying disk means held in place at the bottom of the recess by engagement with said side walls.

5. A shuffleboard weight having a top surface, a recess in the top surface with a drill point cavity at the bottom of the recess, said cavity comprising a depression with a bottom surface sloping downward to a center point, an annular supporting shoulder around the drill point cavity, and an indicia-bearing disk supported by said shoulder and bridging the drill point cavity.

6. A shuffleboard weight having a top surface that slopes downwardly to a center region, a recess at the center region including a drill point cavity, said cavity comprising a depression with a bottom surface sloping downward to a center point, an annular shoulder surrounding the drill point cavity, a frustro-conical side extending upward from said shoulder to the top surface and of decreasing diameter toward the top of the recess, an indicia-bearing disk supported by the shoulder and covering the drill point cavity, and a transparent plastic disk overlying the indicia-bearing disk and retained in the recess by the inward slope of the side wall of the recess.

7. A metal shuffleboard weight having a top wall in which there is a recess having a side wall that slopes inward to give the recess a progressively decreasing diameter toward the top, and an identifying disk supported by the bottom of the recess and retained in place by the slope of the side wall of the recess.

8. A shuffleboard weight having a side wall, a bottom surface with a center region of concave contour surrounded by a frustro-conical surface of substantial radial extent and that merges with the concave region with a smooth curve, said frustro-conical surface merging with the side wall in a round corner.

9. A shuffleboard weight having a side wall, a bottom surface with a hollow ground center region and an annular region surrounding the hollow ground center region and at least a portion of which is frustro-conical and slopes upward toward the side wall and at an acute angle to a board on which the weight rests.

10. A shuffleboard weight having a bottom surface with grind lines of medium grind extending substantially radially from the center region of the surface so as to provide low ridges extending in substantially the direction of travel of the weight at the front thereof for cooperation with wax on the surface of a shuffleboard.

11. A shuffleboard weight of cylindrical cross section and having a bottom surface that has a concave center region comprising an area with a radius equal to at least one-quarter of the radius of the weight, an annular region surrounding the center region and having an upward slope toward the periphery of the weight, and radial grind lines on the bottom surface of the weight over at least the area of the annular region that slopes upward toward said periphery.

12. A cylindrical shuffleboard weight having a peripheral surface, and having a bottom surface with a concave center region on the bottom surface surrounded by an annular area that slopes upwardly at a slight angle toward the periphery of the weight and that meets the concave center region of the bottom in a curve, a rounded bottom edge connecting the peripheral surface with the bottom surface, and grind lines, a medium grind, over substantially the entire bottom surface of the weight.

13. A steel shuffleboard weight of cylindrical shape and having a peripheral surface roughened by circumferentially extending ridges for preventing the weight from slipping out of a player's grip in an axial direction while leaving the peripheral surface free to slide from the player's fingers when the weight is being projected along a shuffleboard.

14. A shuffleboard weight of cylindrical shape and having a center recess and a top surface that slopes downwardly to said center recess so that the center of gravity of the weight is below the mid-point of the axis of the weight, and a peripheral surface of convex contour in the direction of its axial extent, and of maximum diameter in a plane that is normal to the axis of the weight and that extends through the center of gravity of said weight.

15. A shuffleboard weight having a peripheral surface and having a top surface with a round recess in said top surface, an identification disk supported from the bottom of the recess, the depth of said recess being sufficient to locate the top surface of the disk below the top edge of the recess by a distance greater than the depth of a segment of a circle that passes through the top edges of the recess and that has a radius equal to the minimum radius of the peripheral surface of the weight so that the disk cannot be touched by a similar shuffleboard weight that strikes against the top surface at the upper end of said recess.

ELI H. TJOMSLAND.

REFERENCES CITED

The following references are of record in the file of this patent:

UNITED STATES PATENTS

| Number | Name | Date |
| --- | --- | --- |
| 1,963,382 | Reichard | June 19, 1934 |
| 483,895 | Buchley | Oct. 4, 1892 |
| 1,155,273 | Quaite | Sept. 28, 1915 |
| 2,159,966 | Dunham | May 30, 1939 |
| 1,368,401 | Kettle | Feb. 15, 1921 |
| 2,226,516 | Ross | Dec. 24, 1940 |
| 2,253,823 | Suteras | Aug. 26, 1941 |

FOREIGN PATENTS

| Number | Country | Date |
| --- | --- | --- |
| 189,301 | Great Britain | Nov. 30, 1922 |